United States Patent
Beger

(10) Patent No.: US 9,434,360 B2
(45) Date of Patent: Sep. 6, 2016

(54) METHOD AND DEVICE FOR PREVENTING A STATIONARY VEHICLE FROM ROLLING AWAY

(71) Applicant: Dr. Ing. h.c. F. Porsche Aktiengesellschaft, Stuttgart (DE)

(72) Inventor: Ulrich Beger, Weissach (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 120 days.

(21) Appl. No.: 14/249,705

(22) Filed: Apr. 10, 2014

(65) Prior Publication Data
US 2014/0330497 A1 Nov. 6, 2014

(30) Foreign Application Priority Data
May 6, 2013 (DE) .................. 10 2013 104 601

(51) Int. Cl.
| B60T 8/17 | (2006.01) |
| B60T 8/171 | (2006.01) |
| B60T 7/12 | (2006.01) |

(52) U.S. Cl.
CPC .................. *B60T 8/17* (2013.01); *B60T 7/122* (2013.01); *B60T 8/171* (2013.01); *B60T 2201/06* (2013.01); *B60T 2220/04* (2013.01)

(58) Field of Classification Search
CPC ....... B60T 8/17; B60T 8/171; B60T 2220/04
See application file for complete search history.

(56) References Cited

U.S. PATENT DOCUMENTS

| 5,975,648 | A * | 11/1999 | Rump ............................... 303/3 |
| 5,979,619 | A   | 11/1999 | Rump |
| 6,315,372 | B1  | 11/2001 | Kroger et al. |
| 7,401,872 | B2 * | 7/2008 | Kinder et al. ................ 303/191 |
| 8,447,475 | B2  | 5/2013 | Desfriches |
| 8,579,765 | B2 * | 11/2013 | Yu et al. ....................... 477/184 |
| 2006/0079377 | A1 * | 4/2006 | Steen et al. ................... 477/186 |
| 2006/0129299 | A1 * | 6/2006 | Schmidt .................. B60T 7/122 701/71 |
| 2006/0220455 | A1 * | 10/2006 | Schmidt .................. B60T 7/122 303/191 |
| 2009/0306860 | A1 * | 12/2009 | Sokoll et al. .................... 701/48 |
| 2010/0090522 | A1 * | 4/2010 | Bensch .................... B60T 7/107 303/122.15 |
| 2010/0244550 | A1 * | 9/2010 | Hilberer ................. B60T 13/683 303/15 |

(Continued)

FOREIGN PATENT DOCUMENTS

| DE | 19643304 A1 * | 4/1998 | ......... F16H 63/3433 |
| DE | 198 48 448 C2 | 12/2001 | |

(Continued)

OTHER PUBLICATIONS

P. Gaspar, I. Szaszi, J. Bokor, "Brake control to prevent the rollover of heavy vehicles based on a linear parameter varying model," 2003, pp. 3100-3105.*

(Continued)

*Primary Examiner* — Tuan C. To
(74) *Attorney, Agent, or Firm* — RatnerPrestia

(57) ABSTRACT

A method for preventing a stationary vehicle (12) from rolling away, wherein a holding mode can be activated by actuating a brake pedal (18), wherein at least one wheel brake device (14) of the vehicle (12) is controlled in the holding mode in order to generate a braking force in such a way that the vehicle (12) is held in the stationary state, and wherein a physical variable which represents the actuation of the brake pedal is detected, wherein the holding mode is activated if a gradient of the physical variable exceeds an activation threshold value.

14 Claims, 2 Drawing Sheets

(56) References Cited

U.S. PATENT DOCUMENTS

| | | | |
|---|---|---|---|
| 2010/0280724 A1* | 11/2010 | Monsere et al. | 701/70 |
| 2011/0040454 A1* | 2/2011 | Bonne | B60T 7/12 |
| | | | 701/48 |
| 2011/0147144 A1* | 6/2011 | Ma | B60T 13/741 |
| | | | 188/162 |
| 2011/0316326 A1* | 12/2011 | Miyazaki | B60T 8/885 |
| | | | 303/2 |
| 2012/0161508 A1* | 6/2012 | Beever et al. | 303/191 |
| 2012/0235469 A1* | 9/2012 | Miyazaki | B60T 8/4081 |
| | | | 303/9.63 |
| 2012/0271523 A1 | 10/2012 | Sardari Iravani | |
| 2014/0067153 A1* | 3/2014 | Yu | 701/1 |
| 2014/0257609 A1* | 9/2014 | Dufford | B60W 10/06 |
| | | | 701/22 |

FOREIGN PATENT DOCUMENTS

| | | |
|---|---|---|
| DE | 101 51 846 B4 | 7/2004 |
| DE | 10 2004 027 257 A1 | 2/2005 |
| DE | 10 2009 046 495 A1 | 5/2011 |
| JP | 2956008 | 10/1999 |
| KR | 100774139 | 11/2007 |
| KR | 1020100041738 | 4/2010 |
| KR | 1020110064010 | 6/2011 |

OTHER PUBLICATIONS

German Search Report, dated Dec. 9, 2013, corresponding to German counterpart Patent Application No. 10 2013 104 601.0.

* cited by examiner

METHOD AND DEVICE FOR PREVENTING A STATIONARY VEHICLE FROM ROLLING AWAY

CROSS-REFERENCE TO RELATED APPLICATION

This application claims priority under 35 U.S.C. §119 of German Patent Application No. 10 2013 104 601.0, filed May 6, 2013, which is incorporated by reference herein in its entirety.

FIELD OF INVENTION

The present invention relates to a method for preventing a stationary vehicle from rolling away, wherein a holding mode can be activated by actuating a brake pedal, wherein a wheel brake device of the motor vehicle is activated in the holding mode in order to generate a braking force in such a way that the vehicle is held in the stationary state, and wherein a physical variable which represents the actuation of the brake pedal is detected.

The present invention also relates to a device for preventing a stationary vehicle from rolling away, having a control unit which is designed to activate a holding mode when the vehicle is stationary and the brake pedal is actuated, wherein the control unit is designed to activate a wheel brake device of the vehicle in the holding mode in order to generate a braking force, in such a way that the vehicle is held in the stationary state, and having a sensor which is designed to detect a physical variable which represents the actuation of the brake pedal.

Such methods and such devices serve to maintain the stationary state of a vehicle without a braking force having to be continuously maintained by the driver.

BACKGROUND

Such a method and such a device are known from DE 10 151 846 B4, which is incorporated by reference herein, wherein the holding mode is activated by actuating the brake pedal if a comparison variable which describes the actuation of the brake pedal exceeds a predefined threshold value.

However, a disadvantage with the known method and with the known device is that the predefined activation threshold value has to be exceeded by a corresponding pedal actuation force in order to activate the holding mode. The necessary brake actuation force can be laborious and difficult depending on the situation and depending on the physical condition of the driver, with the result that the activation of the holding mode is generally uncomfortable.

SUMMARY

An object of the present invention is therefore to make available a method and a device for preventing a stationary vehicle of the type mentioned at the beginning from rolling away, wherein the activation of the holding mode is generally more comfortable.

This object is achieved with the method mentioned at the beginning in that the holding mode is activated if a gradient of the physical variable exceeds an activation threshold value.

The object is achieved with the device mentioned at the beginning in that the control unit is designed to activate the holding mode if a gradient of the detected physical variable exceeds an activation threshold value.

Since a gradient of the detected physical variable is used to activate the holding mode, that is to say the change in the physical variable is detected and is compared with an activation threshold value, high absolute values of the physical variable are not necessary, with the result that the holding mode can, for example, even be activated by a low force applied to the brake pedal. As a result, the holding mode can be activated individually by different drivers with little effort independently of the current situation, as a result of which the activation of the holding mode becomes more comfortable overall.

An object of the present invention is therefore completely achieved.

In one preferred embodiment of the invention, the gradient of the physical variable corresponds to a derivative of the physical variable over time.

As a result, the holding mode can be activated by a brief, quickly executed actuation of the brake pedal with little effort.

It is also preferred if the gradient of the physical variable corresponds to a mean value of the derivative of the physical variable over time in a predefined time period.

As a result, the gradient can be determined with little technical expenditure since the physical variable does not have to be detected continuously, but rather merely at predefined times.

It is also preferred if the activation threshold value is varied as a function of an absolute value of the physical variable.

As a result, the activation of the holding mode can be adapted to the absolute value of the physical variable, as a result of which the activation of the holding mode becomes generally more comfortable.

It is particularly preferred in this context if the activation threshold value is reduced as a function of the absolute value of the physical variable.

As a result, the holding mode can be activated even if the physical variable has a high absolute value, since the activation threshold value is correspondingly reduced for high values.

It is generally preferred if the physical variable is a brake pressure in at least one of the wheel brake devices.

As a result, the holding mode can be activated on the basis of the actual braking force of the wheel brake devices.

It is also preferred if the physical variable is an initial pressure by the driver, which is generated by the actuation of the brake pedal.

As a result, the holding mode can be activated with little technical expenditure since the initial pressure by the driver is usually detected as a measurement variable, and the measured value which is present merely has to be correspondingly evaluated.

It is also preferred if the physical variable is an actuation force of the brake pedal.

As a result, the holding mode can be activated directly by a driver actuation, as a result of which the method becomes generally more comfortable.

It is also preferred if the physical variable is a pedal travel of the brake pedal.

As a result, the holding mode can be activated independently of the pedal actuation force which has to be applied, as a result of which the holding mode is generally activated more easily.

It is also preferred if the holding mode is deactivated if an accelerator pedal travel of an accelerator pedal exceeds a predefined threshold value.

As a result, the holding mode can be intuitively deactivated by actuating the accelerator pedal, since the holding mode is automatically deactivated when the vehicle drives off.

It is also preferred if the holding mode is deactivated if an engine torque exceeds a predefined threshold value.

As a result, the holding mode can be deactivated when the motor vehicle is ready to drive off, as a result of which rolling back can simultaneously be prevented.

It is also preferred if the holding mode is deactivated if a gear selector lever is actuated.

As a result, the holding mode can be actively deactivated by the driver without actuation of the pedals.

It is also preferred if, after deactivation of the holding mode and an unchanged vehicle stationary state, the holding mode can be activated a predefined number of times.

As a result, the method becomes generally more flexible as a function of the situation, since even an unintended deactivation can be cancelled out again and the holding mode can be correspondingly activated again.

Of course, the features which are mentioned above and those which are still to be explained below can be used not only in the respectively specified combination but also in other combinations or alone without departing from the scope of the present invention.

BRIEF DESCRIPTION OF THE DRAWINGS

Exemplary embodiments of the invention are illustrated in the drawing and will be explained in more detail in the following description. In the drawing.

DETAILED DESCRIPTION

Figure 1:
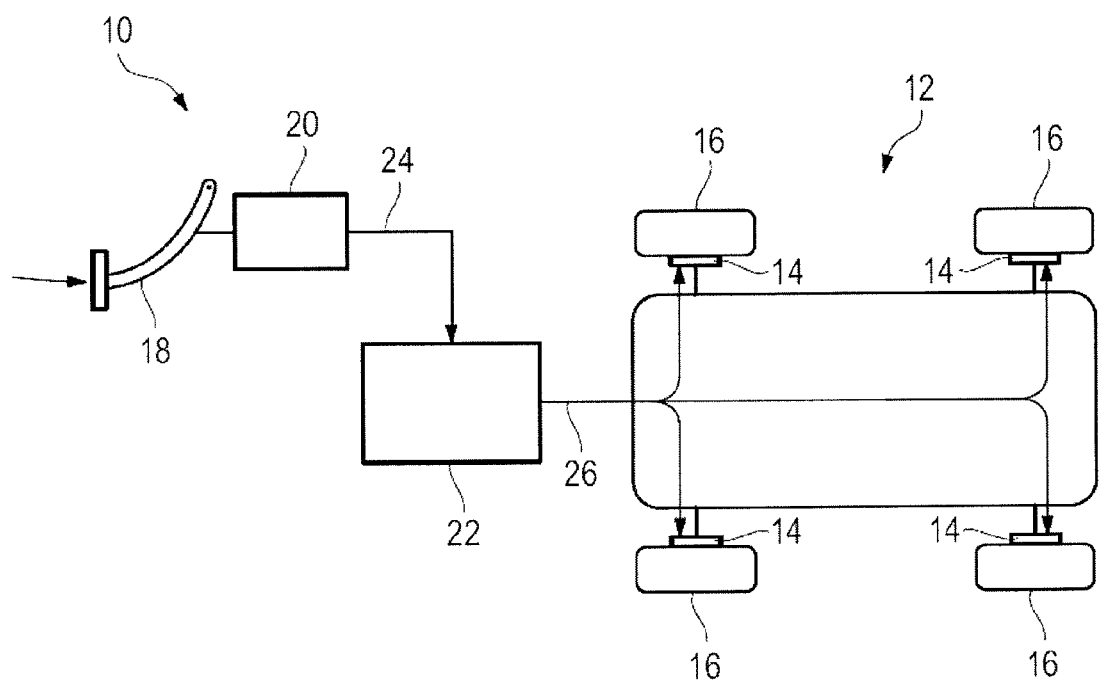
FIG. 1 shows a schematic illustration of a device for preventing a stationary motor vehicle from rolling away.

FIG. 1 is a schematic illustration of a brake device which is denoted generally by 10. The brake device 10 is assigned to a motor vehicle 12 which has wheel brake devices 14 in order to brake wheels 16 of the motor vehicle 12.

The brake device 10 has a brake pedal 18 which is movably mounted and can be moved or actuated for the braking request by a user. The brake pedal 18 is assigned a brake pedal sensor 20 which generally detects a physical variable which describes the actuation of the brake pedal. The detected variable can be an actuation force F which is applied to the brake pedal 18, a pedal travel S by which the brake pedal 18 is moved, an actuation speed V with which the brake pedal 18 is moved, or a brake pressure P which is generated by the actuation of the brake pedal 18. The brake pedal sensor 20 is connected to a control unit 22 in order to pass on the detected physical variable to the control unit 22 for evaluation. The brake pedal sensor 20 is usually connected to the control unit 22 by means of one or more electrical signal lines 24, wherein in particular embodiments the brake pedal sensor 20 can also be connected to the control unit 22 via a hydraulic line, in order to pass on a hydraulic initial brake pressure to the control unit 22.

The control unit 22 is connected to the wheel brake devices 14 of the wheels 16 via brake 35 lines 26 in order to actuate the latter jointly or selectively and to brake the corresponding wheels 16. The control unit 22 can activate the wheel brake devices 14 here in accordance with the actuation of the brake pedal and can apply a corresponding braking force to the wheels 16, or else actuate the wheel brake devices 14 together or selectively by means of specific actuation patterns of the brake pedal 18, or else by means of other control devices.

The control unit 22 is designed to prevent rolling away of the stationary vehicle 12 by means of a holding mode. This holding mode is activated here by a specific actuation of the brake pedal 18, as is explained in more detail below. The holding mode serves to brake the stationary vehicle 12 in such a way that rolling away is prevented, for example in stationary traffic or at a traffic light sign, in order to relieve the driver such that the driver does not have to actuate the brake pedal 18 for the entire duration of the stationary state of the vehicle.

In order to activate the holding mode, the physical variable which describes the actuation of the brake pedal and which is detected by the brake pedal sensor, is generally evaluated, and on the basis of the evaluation of the physical variable the holding mode is activated by the control unit 22 and actuated in accordance with the wheel brake devices 14. The holding mode can optionally be deactivated by actuating the accelerator pedal or a drive position selector lever, with the result that the motor vehicle 12 can be started again.

In order to activate the holding mode, a stationary state of the vehicle 12, which is detected by corresponding sensors, is firstly necessary. In addition, the physical variable must exceed a first threshold value A. This first threshold value A serves to determine whether a corresponding actuation of the brake is present, in order to determine whether the stationary state of the vehicle and the later activation of the holding mode take place on the basis of the driver's actual request. For this purpose, the initial pressure $P_v$ by the driver, that is to say the pressure which is generated by the actuation of the brake pedal at the brake pedal sensor 20, is usually detected. Alternatively, the abovementioned physical variables such as, for example, the actuation force F, pedal travel S, pedal speed V can also be evaluated in order to correspondingly determine the driver's request.

After this, the holding mode is activated if the brake pedal 18 is actuated again and if a gradient of the detected physical variable exceeds an activation threshold value G. The gradient of the physical variable is usually the derivative of the physical variable over time. In other words, the change in the physical variable over time is detected and evaluated. If the gradient exceeds the activation threshold value G, the holding mode is activated and the wheel brake devices 14 are correspondingly activated or the brake pressure which is present in the wheel brake devices 14 is held and/or shut in by closing the valves, in order to prevent the stationary vehicle from rolling away. During operation of the vehicle, in other words the motor vehicle 12 is firstly braked down as far as the stationary state by a normal actuation of the brake pedal 18. During the stationary state of the vehicle, the brake pedal actuation usually exceeds a specific value which corresponds to the first threshold value A. In order to activate the holding mode, the brake pedal 18 is briefly and quickly actuated again, or in other words it is "pressed down again". This brief brake pedal actuation allows a gradient in the physical variable which exceeds the threshold value G to be generated, with the result that the driver's request to activate the holding mode is detected and the wheel brake devices 14 can be correspondingly activated.

Figure 2A:
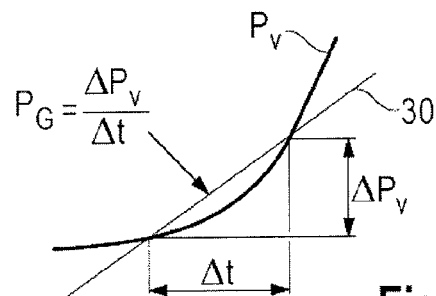
FIGS. 2-2a shows a diagram of an initial pressure by the driver as a function of time in order to explain the activation of the holding mode.
Figure 2:
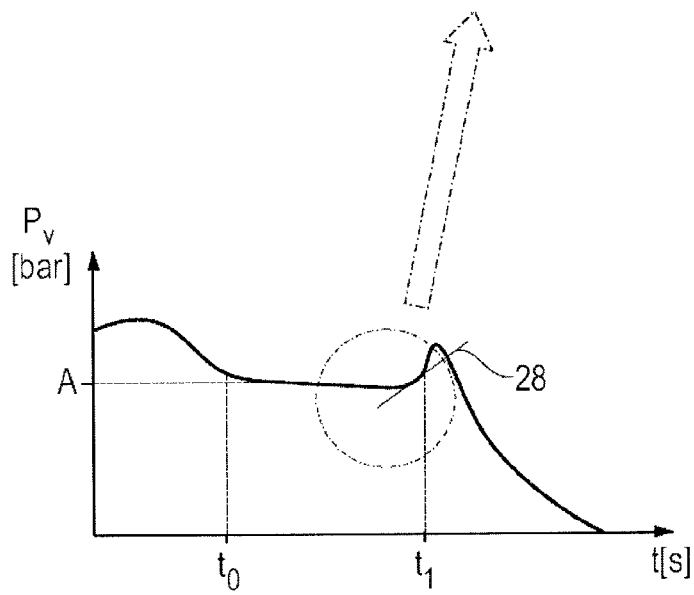

FIG. 2 illustrates a time diagram of the initial pressure by the driver for activating the holding mode in a schematic form. Of course, the illustration of the initial pressure by the driver is merely an example of an embodiment of the physical variable which can be detected for activating the holding mode by the brake pedal sensor 20. The initial pressure by the driver is generally denoted by $P_v$ in FIG. 2.

In order to brake the vehicle, the initial pressure $P_v$ by the driver can firstly increase as a result of the brake pedal actuation, and easily drop again up to the stationary state of the vehicle at the time $t_0$. At the time $t_0$, the stationary state of the vehicle 12 is reached, wherein at the same time the initial pressure $P_v$ by the driver is in this case higher than the first threshold value A, as is indicated schematically in FIG. 2. In order to activate the holding mode, the brake pedal 18 is now actuated again, and at $t_1$ the change in the initial pressure $P_v$ by the driver over time, that is to say the first derivative of the initial pressure $P_v$ by the driver over time, exceeds a predefined threshold value G, with the result that at $t_1$ the holding mode is activated. After this, the initial pressure $P_v$ by the driver drops, since a further actuation of the brake pedal by the holding mode is not necessary. The gradient of the initial pressure $P_v$ by the driver is indicated schematically in FIG. 2 by a tangent 28.

In FIG. 2a, a region of the diagram from FIG. 2 around the time $t_1$ is illustrated in detail. The initial pressure $P_v$ by the driver can, as illustrated in FIG. 2a, also be determined by applying a secant 30, wherein the respective initial pressure $P_v$ by the driver is measured at different times with an interval $\Delta t$ and an averaged gradient $P_G$ of the initial pressure $P_v$ by the driver can be determined over the time interval $\Delta t$. As a result, in general the technical effort for determining the gradient can be reduced and at the same time activation by incorrect measurements can be prevented. The time interval $\Delta t$ or the time window $\Delta t$ constitutes a defined time period which can be, for example, between 1 ms and 1000 ms.

As a result of the general detection of the physical variable and the corresponding time derivative, the activation of the holding mode can be initiated comfortably by brief rapid actuation of the brake pedal 18, and can be detected reliably with little effort.

Figure 3:
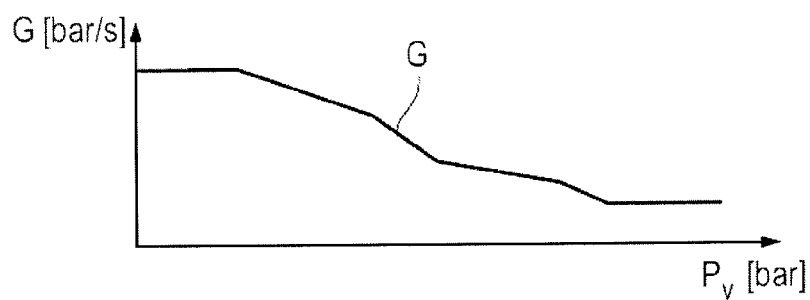
FIG. 3 shows a diagram explaining an activation threshold value which is dependent on the initial pressure.

In FIG. 3, the activation threshold value G for the gradient of the physical variable is illustrated schematically plotted against an absolute value of the physical variable. In this case, the activation threshold value G is illustrated plotted against the initial pressure $P_v$ by the driver, wherein the dependence on the initial pressure $P_v$ by the driver is to be considered only exemplary here and the illustrated dependence is possible on any of the abovementioned measurable physical variables.

The activation threshold value G is, as illustrated in FIG. 3, dependent on the absolute value of the measured physical variable, wherein the activation threshold value G usually decreases with increasing absolute values of the physical variable. As a result, it is possible to ensure that the brief rapid actuation of the brake pedal 18 can take place comfortably during the actuation of the brake pedal 18. Since a necessary brief rapid actuation of the brake pedal 18, for example in the case of a large force which is already applied to the brake pedal 18, is more difficult to achieve, the reduction in the activation threshold value G with an increasing absolute value of the physical variable can make achieving the threshold value G easier, as a result of which the activation of the holding mode is generally more comfortable.

After the activation of the holding mode, the holding mode can be deactivated by actuating the accelerator pedal, or else if the engine torque exceeds a predefined threshold value, that is to say if the driver wishes to continue the journey, or else if the driver wishes to end the journey by actuating the drive position selector lever, for example into the neutral position or parked position.

The holding mode can also be deactivated after a predefined time period of, for example, 5 min or if the driver exits the vehicle.

In another specific embodiment, the holding mode can be activated again in the same way after such a deactivation and at the same time with an unchanged vehicle stationary state by correspondingly actuating the brake pedal 18. After deactivation, the holding mode can be reactivated a predefined number of times.

The invention claimed is:

1. A method for preventing a stationary vehicle from rolling away, comprising the steps of actuating a brake pedal to bring the vehicle to a stationary state, and afterward actuating the brake pedal again to activate a holding mode, wherein at least one wheel brake device of the vehicle is activated in the holding mode in order to generate a braking force in such a way that the vehicle is held in the stationary state, and detecting at least one physical variable which represents the subsequent actuation of the brake pedal, wherein the holding mode is activated if a gradient of at least one detected physical variable exceeds an activation threshold value.

2. The method as claimed in claim 1, wherein the gradient of the physical variable corresponds to a derivative of the physical variable over time.

3. The method as claimed in claim 1, wherein the gradient of the physical variable corresponds to a mean value of the derivative of the physical variable over time in a predefined time period.

4. The method as claimed in claim 1, wherein the activation threshold value is varied as a function of an absolute value of the physical variable.

5. The method as claimed in claim 4, wherein the value of the activation threshold value is reduced or implemented in a variable fashion as a function of the absolute value of the physical variable.

6. The method as claimed in claim 1, wherein the physical variable is a brake pressure P in at least one of the wheel brake devices.

7. The method as claimed in claim 1, wherein the physical variable is an initial pressure $P_v$ by the driver, which is generated by the actuation of the brake pedal.

8. The method as claimed in claim 1, wherein the physical variable is an actuation force F of the brake pedal.

9. The method as claimed in claim 1, wherein the physical variable is a pedal travel S of the brake pedal.

10. The method as claimed in claim 1, wherein the holding mode is deactivated if an accelerator pedal travel of an accelerator pedal exceeds a predefined threshold value.

11. The method as claimed in claim 1, wherein the holding mode is deactivated if an engine torque exceeds a predefined threshold value.

12. The method as claimed in claim 1, wherein the holding mode is deactivated if a gear selector lever is actuated.

13. The method as claimed in claim 10, wherein, after deactivation of the holding mode and an unchanged vehicle stationary state, a predefined number of activations of the holding mode are possible.

14. A device for preventing a stationary vehicle from rolling away, having a control device which is designed to activate a holding mode as a result of the actuation of a brake pedal when the vehicle is stationary, wherein the control unit is designed to control a wheel brake device of the vehicle in the holding mode in order to generate a braking force, in such a way that the vehicle is held in the stationary state, and having a sensor which is designed to detect a physical variable which represents the actuation of the brake pedal, wherein the control device is designed to activate the holding mode if a gradient of the physical variable exceeds an activation threshold value.

* * * * *